(12) United States Patent
Fukumori

(10) Patent No.: US 7,714,560 B2
(45) Date of Patent: May 11, 2010

(54) STEP-DOWN SWITCHING REGULATOR

(75) Inventor: Yoshitaka Fukumori, Kyoto (JP)

(73) Assignee: Rohm Co., Ltd. (JP)

( * ) Notice: Subject to any disclaimer, the term of this patent is extended or adjusted under 35 U.S.C. 154(b) by 288 days.

(21) Appl. No.: 11/995,431

(22) PCT Filed: Jul. 11, 2006

(86) PCT No.: PCT/JP2006/313768

§ 371 (c)(1),
(2), (4) Date: Jan. 11, 2008

(87) PCT Pub. No.: WO2007/007752

PCT Pub. Date: Jan. 18, 2007

(65) Prior Publication Data

US 2009/0146631 A1    Jun. 11, 2009

(30) Foreign Application Priority Data

Jul. 11, 2005    (JP)    ............... 2005-201091

(51) Int. Cl.
G05F 1/40    (2006.01)
(52) U.S. Cl. ............ 323/284; 232/225; 232/285
(58) Field of Classification Search ............ 323/225, 323/282–285
See application file for complete search history.

(56) References Cited

U.S. PATENT DOCUMENTS 6,157,182 A * 12/2000 Tanaka et al. ............. 323/284
6,979,985 B2 * 12/2005 Yoshida et al. ............ 323/282
2005/0052168 A1 * 3/2005 Tazawa et al. ............. 323/282
2006/0109039 A1 * 5/2006 Wu ............................ 327/172

FOREIGN PATENT DOCUMENTS

| JP | 6-14533 A | 1/1994 |
| JP | 10-225105 A | 8/1998 |
| JP | 2000-201475 A | 7/2000 |
| JP | 2002-252971 A | 9/2002 |
| JP | 2002-281744 A | 9/2002 |
| JP | 2003-319643 A | 11/2003 |
| JP | 2004-32875 A | 1/2004 |
| JP | 2005-39907 A | 2/2005 |

OTHER PUBLICATIONS

International Search Report for International Application No. PCT/JP2006/313768 mailed Oct. 10, 2006.
Written Opinion of the International Searching Authority for PCT/JP2006/313768 mailed Oct. 10, 2006.

* cited by examiner

*Primary Examiner*—Bao Q Vu
*Assistant Examiner*—Jue Zhang
(74) *Attorney, Agent, or Firm*—Cantor Colburn LLP

(57) ABSTRACT

In a control circuit which turns on/off the switching device elements included in a synchronous rectifier step-down switching regulator, a hysteresis comparator compares the detection voltage that corresponds to the output voltage of the step-down switching regulator with a first threshold voltage and a second threshold voltage. A light-load detection circuit detects whether or not a load is in the light-load state. A driver circuit turns on/off the switching device elements according to the pulse signal output from the hysteresis comparator. Upon the light-load detection circuit detecting the light-load state, the hysteresis comparator shifts the second threshold voltage toward the higher-voltage side by a predetermined voltage difference.

10 Claims, 5 Drawing Sheets

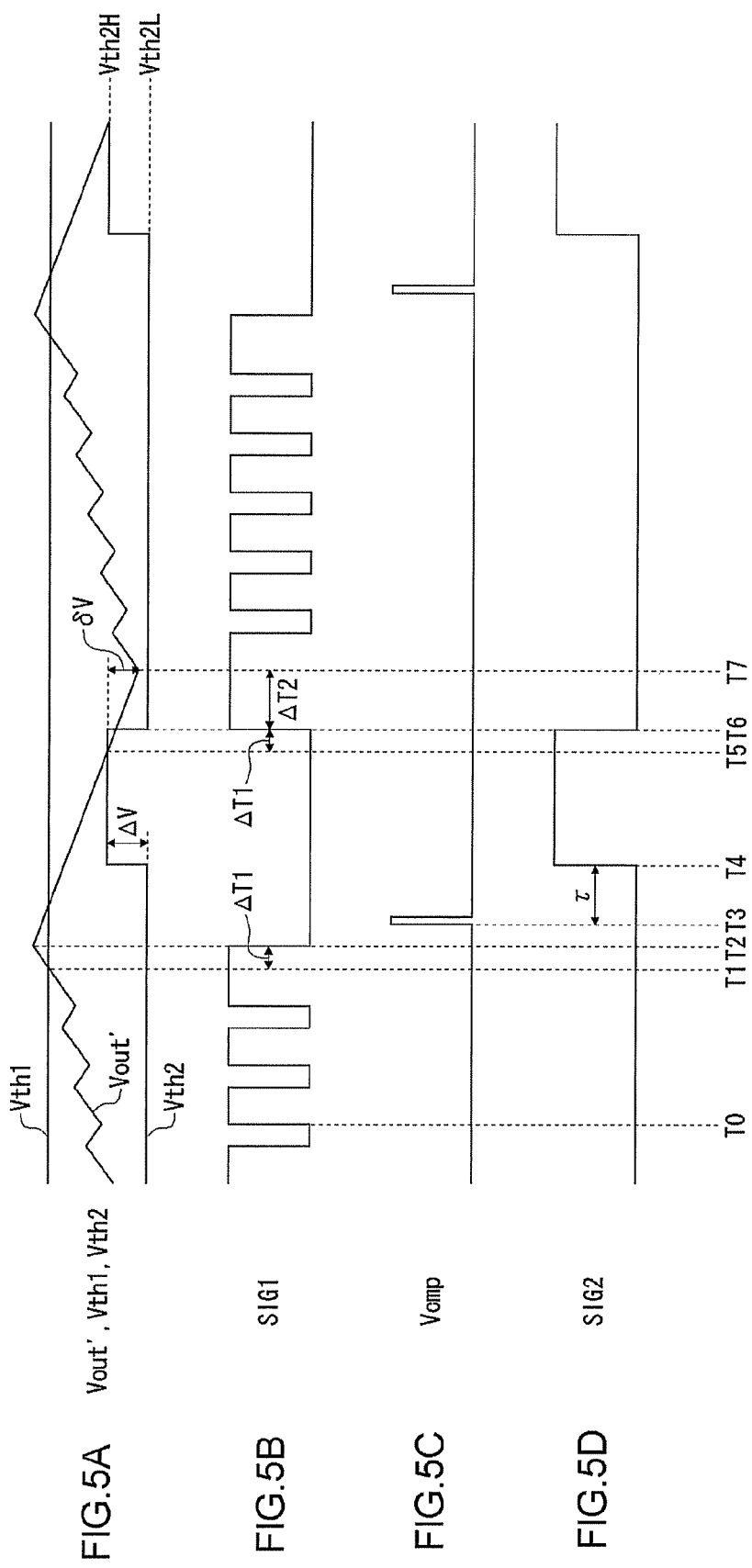

STEP-DOWN SWITCHING REGULATOR

CROSS REFERENCE TO RELATED APPLICATIONS

This is a U.S. national stage of application No. PCT/JP2006/313768, filed on 11 Jul. 2006. Priority under 35 U.S.C. §119(a) and 35 U.S.C. §365(b) is claimed from Japanese Application No. 2005-201091, filed 11 Jul. 2005, the disclosure of which is also incorporated herein by reference.

BACKGROUND OF THE INVENTION

1. Field of the Invention

The present invention relates to a step-down switching regulator, and particularly to a control technique for a synchronous rectifier switching regulator.

2. Description of the Related Art

In recent years, microprocessors for providing digital signal processing are mounted in various electronic devices such as cellular phones, PDAs (Personal Digital Assistants), notebook-sized personal computers, etc. The power supply voltage necessary for driving such a microprocessor is being reduced as the fine semiconductor manufacturing process is being improved. For example, a microprocessor is known which operates at a low voltage of 1.5 V or less.

A battery such as a lithium ion battery or the like is mounted on such electronic devices as a power supply. The lithium ion battery outputs voltage of around 3 V to 4V. Such an arrangement, in which the output voltage is directly supplied to the microprocessor, leads to wasteful power consumption, and accordingly, in general, after the battery voltage is stepped down using a step-down switching regulator, a series regulator, or the like, the constant voltage thus stepped down is supplied to the microprocessor.

Two types of step-down switching regulators are known. One is a switching regulator using a rectifier diode (which will be referred to as a "rectifier diode switching regulator" hereafter). The other is a switching regulator using a rectifier transistor instead of the rectifier diode (which will be referred to as a "synchronous rectifier switching regulator" hereafter). The former type has the advantage of exhibiting high efficiency when a load current is low. However, such an arrangement requires a diode, in addition to an inductor and a capacitor, in the form of external components to a control circuit, leading to a large circuit area. On the other hand, the latter type provides poor efficiency when a low current is supplied to the load, as compared with the former type. However, with such an arrangement, a transistor is employed instead of a diode, which allows the control circuit to be integrated in the form of an LSI. This offers a small circuit area incorporating peripheral components. There is a demand for reducing the size of electronic devices such as cellular phones. In many cases, a switching regulator using a rectifier transistor (which will be referred to as a "synchronous rectifier switching regulator" hereafter) is employed in such an arrangement in order to satisfy such a demand for a reduced size.

Directing our attention to the microprocessor employed in the aforementioned electronic devices, when the microprocessor operates for performing computation processing, a certain amount of current flows through the microprocessor. On the other hand, when the microprocessor is in the standby state, only a small amount of current flows through the microprocessor. FIG. 6A is a diagram which shows the current waveform with respect to time when the synchronous rectifier switching regulator is connected to a heavy load. FIG. 6B is a diagram which shows the current waveform with respect to time when the synchronous rectifier switching regulator is connected to a light load. In these drawings, IL represents the current that flows through the output inductor (which will also be referred to as the "inductor current IL" hereafter). Iout represents the load current. Here, the load current Iout is obtained by averaging the inductor current IL over time. As shown in FIG. 6A, when the synchronous rectifier switching regulator is connected to a heavy load, the load current Iout is large. Accordingly, the inductor current IL is always positive. Here, the inductor current IL flowing toward the load is positive by definition. On the other hand, let us consider a case in which the synchronous rectifier switching regulator is connected to a light load as shown in FIG. 6B. In this case, reduction of the load current Iout leads to a negative inductor current IL as indicated by the hatched portion in FIG. 6B. That is to say, in this stage, the direction of the inductor current IL reverses. As a result, with such an arrangement employing the synchronous rectification method, when the synchronous rectifier switching regulator is connected to a light load, current flows from the output inductor to the ground through the synchronous rectifier transistor. This current is supplied from the output capacitor, but is not supplied to the load. This leads to wasteful power consumption.

For example, Patent documents 1 through 3 disclose switching regulators each of which has a function of switching rectification methods between the synchronous rectification method and the diode rectification method based upon the load current. In the techniques described in Patent documents 2 and 3, the inductor current IL is monitored. In a case in which the inductor current changes from a positive value to a negative value, the synchronous rectifier transistor is turned off so as to stop the switching operation, thereby improving the efficiency.

[Patent Document 1]
 Japanese Patent Application Laid-open No. 2004-32875

[Patent Document 2]
 Japanese Patent Application Laid-open No. 2002-252971

[Patent Document 3]
 Japanese Patent Application Laid-open No. 2003-319643

The present inventor has studied a switching regulator which compares the detection voltage that corresponds to the output voltage of the switching regulator with two threshold voltages, i.e., a first threshold voltage at a high level and a second threshold voltage at a low level, using a hysteresis comparator, and which drives a switching transistor and a synchronous rectifier transistor based upon the comparison result. As a result, the present inventor has come to recognize the following problems.

In order to reduce the fluctuation range of the output voltage of a switching regulator employing a hysteresis comparator, the difference between the first threshold voltage and the second threshold voltage, i.e., the hysteresis range is preferably set to as small a value as possible. However, in some cases, extreme reduction of the hysteresis range adversely affects the switching control operation. Furthermore, irregularities in the process for manufacturing the hysteresis comparator lead to irregularities in the hysteresis range. Accordingly, extreme reduction of the hysteresis range adversely affects the switching control operation due to irregularities in the process of manufacturing the hysteresis. Giving consideration to such circumstances, there is a need to set the hysteresis range to a predetermined value or higher.

As described in the aforementioned Patent documents, after the switching operation is stopped in the light-load state, the detection voltage gradually drops according to the reduction in the output voltage. Accordingly, when the detection voltage drops to the second threshold voltage of the hysteresis comparator, there is a need to raise the output voltage by restarting the switching operation. However, restarting of the switching operation involves a certain delay after stopping of the switching operation in the light-load state. As a result, with such an arrangement having a function whereby, in a case in which the detection voltage drops to the second threshold voltage, the switching operation is restarted, the detection voltage drops during this delay time. This leads to increased rippling of the output voltage.

SUMMARY OF THE INVENTION

The present invention has been made in view of the aforementioned problems. Accordingly, it is a general purpose of the present invention to provide a synchronous rectifier step-down switching regulator employing a hysteresis comparator which outputs output voltage with a reduced ripples in the light-load state.

An embodiment of the present invention relates to a control circuit which turns on/off switching device elements of a synchronous rectifier switching regulator. The control circuit comprises: a hysteresis comparator which compares a detection voltage that corresponds to an output voltage of the step-down switching regulator with a first threshold voltage and a second threshold voltage which is lower than the first threshold voltage; a light-load detection circuit which detects whether or not a load connected to the step-down switching regulator is in the light-load state; and a driver circuit which turns on/off the switching device elements according to a pulse signal output from the hysteresis comparator. With such an arrangement, upon the light-load detection circuit detecting the light-load state, the hysteresis comparator shifts the second threshold voltage toward a higher voltage side by a predetermined voltage difference. After the light-load detection circuit detects the light-load state, the driver circuit stops the ON/OFF operation of the switching device elements during a period from the time point at which the detection voltage rises up to the first threshold voltage to the time point at which the detection voltage drops to the second threshold voltage thus shifted.

With such an embodiment, in a case in which the switching operation of the switching device elements is stopped in the light-load state, the second threshold voltage is raised giving consideration to a period in time required for restarting the switching operation. This prevents excessive reduction in the output voltage of the switching regulator, thereby suppressing rippling of the output voltage.

Also, the hysteresis comparator may shift the second threshold voltage to the higher voltage side after elapsing of a predetermined delay time from the time point at which the light-load state is detected.

With such an arrangement, in a case in which the load becomes heavy immediately after the driver circuit stops the switching operation according to the detection of the light-load state, the switching device elements are driven based upon the second threshold voltage without being shifted.

Also, when the detection voltage drops to the second threshold voltage thus shifted after the second threshold voltage is shifted to the higher voltage side, the hysteresis comparator may shift the second threshold voltage toward a lower voltage side by the aforementioned predetermined voltage difference again.

Also, the hysteresis comparator may include a feedback resistor and a feedback capacitor connected in series between an output terminal thereof and a terminal to which the detection voltage is input.

Also, the hysteresis comparator may include: a first comparator which compares the detection voltage with the first threshold voltage; a second comparator which compares the detection voltage with the second threshold voltage; and a flip-flop circuit which is set and reset according to the output signals of the first comparator and the second comparator. With such an arrangement, the output signal of the flip-flop circuit may be output as the aforementioned pulse signal.

Also, the control circuit may further includes a threshold voltage generating circuit which generates the first and second threshold voltages. With such an arrangement, the threshold voltage generating circuit may include multiple voltage-dividing resistors connected in series between a reference voltage terminal, to which a predetermined reference voltage is applied, and the ground. Furthermore, voltages may be selected from among multiple voltages at nodes at which the resistors are connected to one another, and the voltages thus selected may be output as the first threshold voltage and the second threshold voltage.

The hysteresis comparator having the above-described configuration suitably controls the threshold voltage of the hysteresis comparator as necessary.

Also, the light-load detection circuit may include a light-load detection comparator which compares, with the ground potential, a switching voltage at the connection node between a switching transistor and a synchronous rectifier transistor, each of which is the switching device element. With such an arrangement, in a case in which the switching voltage exceeds the ground potential during the ON-state of the synchronous rectifier transistor, the light-load detection circuit may determine that the load is in the light-load state.

When the direction of the current flowing toward the output inductor reverses in the light-load state, the current flows toward the ground via the synchronous rectifier transistor. In this stage, the switching voltage becomes positive voltage. Thus, such an arrangement suitably detects the light-load state by monitoring the switching voltage.

Also, the control circuit may be monolithically integrated on a single semiconductor substrate. Examples of arrangements "integrally formed" include: an arrangement in which all the components of a circuit are formed on a semiconductor substrate; and an arrangement in which principal components of a circuit are integrally formed. With such an arrangement, a part of the resistors, capacitors, and so forth, for adjusting circuit constants, may be provided in the form of components external to the semiconductor substrate.

Another embodiment of the present invention relates to a step-down switching regulator. The step-down switching regulator comprises: a switching regulator output circuit which includes an output capacitor with one grounded terminal, and an output inductor with one terminal connected to the other terminal of the output capacitor; and the above-described control circuit which supplies a switching voltage to the switching regulator output circuit. With such an arrangement, the output at the other terminal of the output capacitor is output as the output voltage.

Such an embodiment prevents excessive reduction in the output voltage of the step-down switching regulator in the light-load state, thereby reducing rippling of the output voltage.

Yet another embodiment of the present invention relates to an electronic device. The electronic device comprises: a battery; a microprocessor; and the above-described step-down switching regulator which steps down the battery voltage output from the battery, and which supplies the battery voltage thus stepped down to the microprocessor.

Such an embodiment reduces rippling of the output voltage of the step-down switching regulator, thereby providing the stable operation of the microprocessor.

It is to be noted that any arbitrary combination or rearrangement of the above-described structural components and so for this effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures in which:

FIGS. 5A through 5D are time charts which show the operation state of the step-down switching regulator shown in FIG. 1 in a light-load state.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
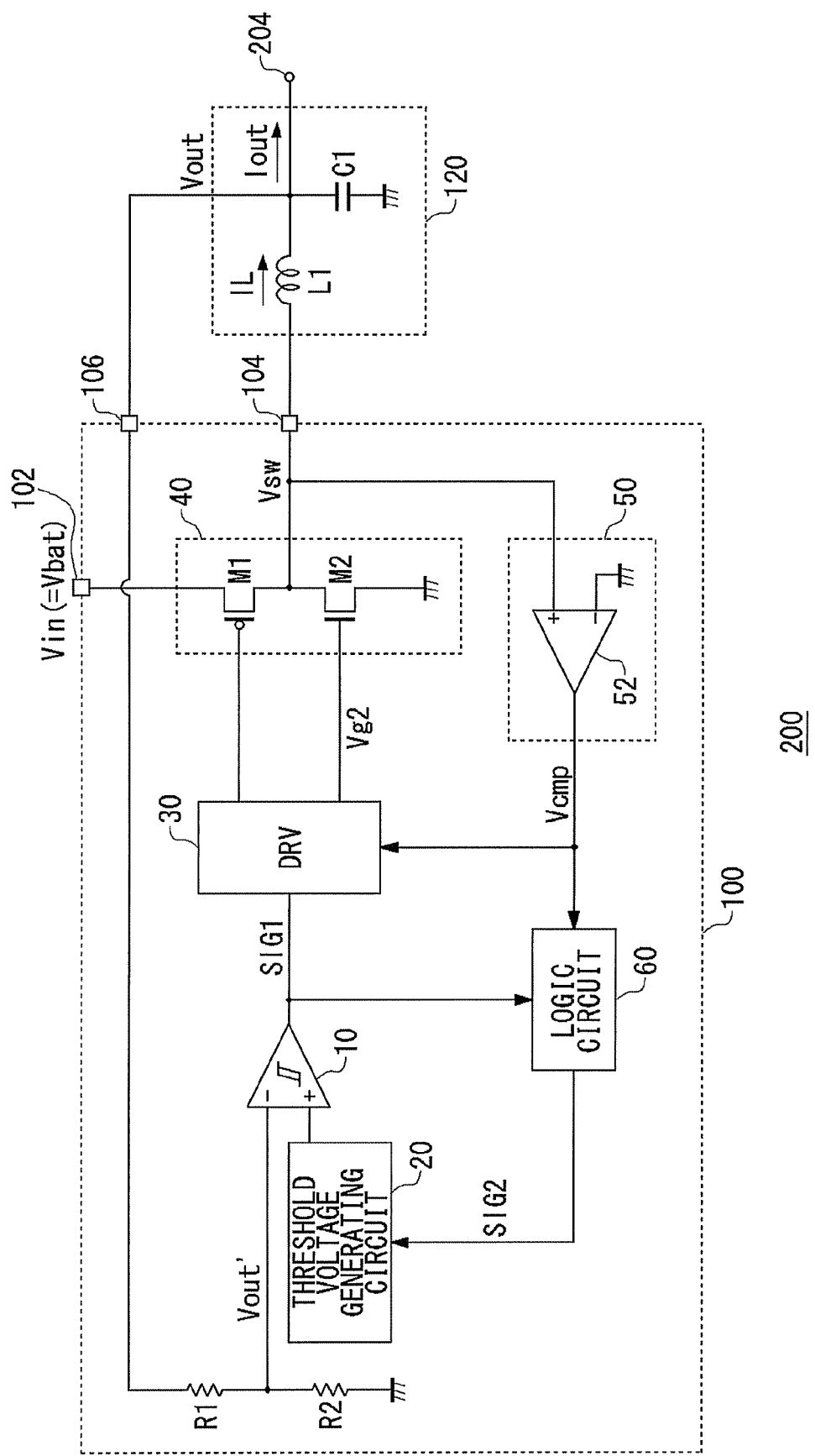
FIG. 1 is a circuit diagram which shows a configuration of a step-down switching regulator according to an embodiment.
Figure 2:
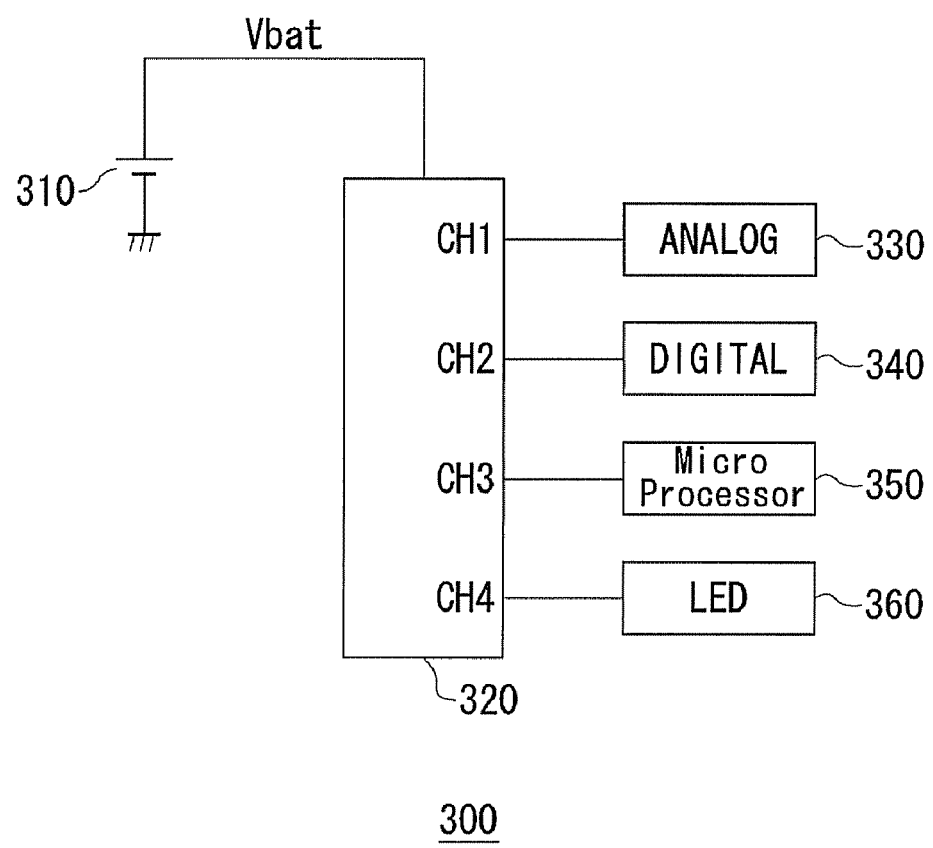
FIG. 2 is a block diagram which shows a configuration of an electronic device mounting the step-down switching regulator shown in FIG. 1.

FIG. 1 is a circuit diagram which shows a configuration of a step-down switching regulator 200 according to an embodiment. FIG. 2 is a block diagram which shows a configuration of an electronic device 300 mounting the step-down switching regulator 200 shown in FIG. 1. The electronic device 300 is a small-sized battery-driven information terminal such as a cellular phone terminal, a CD player, a PDA, or the like, for example. Description will be made below regarding an arrangement in which the electronic device 300 is a cellular phone terminal.

The electronic device 300 includes a battery 310, a power supply device 320, an analog circuit 330, a digital circuit 340, a microprocessor 350, and an LED 360. The battery 310 is a lithium ion battery, for example, and outputs a battery voltage Vbat of 3-4 V. The analog circuit 330 includes high-frequency circuits such as a power amplifier, an antenna switch, an LNA (Low Noise Amplifier), a mixer, a PLL (Phase Locked Loop), etc. The power supply voltage Vcc (=around 3.4 V) is required for the stable operations of such circuit blocks. The digital circuit 340 includes various kinds of DSPs (Digital Signal Processors) and so forth. The power supply voltage Vdd (=around 3 to 4 V) is also required for the stable operations of such circuit blocks. The microprocessor 350 is a block which integrally controls the overall operation of the electronic device 300. The microprocessor 350 operates at the power supply voltage of 1.5 V. The LED 360 includes three kinds of LEDs (Light Emitting Diodes) consisting of red, green, and blue LEDs. The LED 360 is used as a back light for the liquid crystal or as an illumination device. The operation of the LED 360 requires the driving voltage of 4 V or more.

The power supply device 320 is a multi-channel switching power supply which includes multiple switching regulators each of which steps up or steps down the battery voltage Vbat as necessary for the respective channels. Specifically, the power supply device 320 supplies suitable power supply voltages to the analog circuit 330, the digital circuit 340, the microprocessor 350, and the LED 360.

The step-down switching regulator 200 shown in FIG. 1 according to the present embodiment is preferably employed as a power supply which supplies stable driving voltage to a load, the power consumption of which changes according to its operation state, such as the microprocessor 350 which operates at an operation voltage of 1.5 V. Returning to FIG. 1, detailed description will be made below regarding a configuration of the step-down switching regulator 200 according to the present embodiment.

The step-down switching regulator 200 is a synchronous rectifier step-down switching regulator which includes a control circuit 100 and a switching regulator output circuit 120. The control circuit 100 is integrally formed on a single semiconductor substrate, i.e., is provided in the form of an LSI chip. A switching transistor M1 and a synchronous rectifier transistor M2, each of which serves as a switching device, are included within the control circuit 100. Also, the switching transistor M1 and the synchronous rectifier transistor M2 may be provided in the form of discrete devices external to the control circuit 100.

The switching regulator output circuit 120 includes an output inductor L1 and an output capacitor C1. One terminal of the output capacitor is grounded. The other terminal thereof is connected to one terminal of the output inductor L1. The other terminal of the output inductor L1 is connected to the control circuit 100. The step-down switching regulator 200 outputs, to an unshown load, the output voltage Vout, which is the voltage at the output capacitor C1. Description will be made in the present embodiment regarding an arrangement in which the load is a microprocessor 350 shown in FIG. 2.

With the step-down switching regulator 200, the control circuit 100 performs energy conversion so as to step down the output voltage Vin by controlling the current flowing through the output inductor L1. The voltage thus stepped down is smoothed by the capacitor C1. The voltage thus smoothed is supplied as the output voltage Vout to the load connected to the output terminal 204. The current flowing through the load will be referred to as the "load current Iout" hereafter. The current flowing through the output inductor L1 will be referred to as the "inductor current IL" hereafter. Here, the direction of the inductor current IL flowing toward the load is positive by definition.

The control circuit 100 includes, as input/output terminals thereof, an input terminal 102, a switching terminal 104, and a voltage feedback terminal 106. The input terminal 102 is connected to the battery 310, and receives the battery voltage Vbat as the input voltage Vin. The switching terminal 104 is connected to the output inductor L1, which outputs the switching voltage Vsw generated within the control circuit 100. The voltage feedback terminal 106 is a feedback terminal which returns as the feedback voltage the output voltage Vout applied to an unshown load.

The control circuit 100 includes a hysteresis comparator 10, a threshold voltage generating circuit 20, a driver circuit 30, an output stage 40, a light-load detection circuit 50, a first resistor R1, and a second resistor R2.

The output stage 40 includes the switching transistor M1 and the synchronous rectifier transistor M2 each of which is a switching device element. The switching transistor M1 is a P-channel MOS transistor. The source thereof is connected to the input terminal 102, and the drain thereof is connected to the switching terminal 104. The back gate of the switching transistor M1 is connected to the input terminal 102.

The synchronous rectifier transistor M2 is an N-channel MOS transistor. The source thereof is grounded, and the drain thereof is connected to the drain of the switching transistor M1 and the switching terminal 104. Furthermore, the back gate of the synchronous rectifier transistor M2 is grounded.

The switching transistor M1 and the synchronous rectifier transistor M2 are connected serially between the input terminal 102, to which the input voltage Vin is applied, and the ground. With such an arrangement, the voltage at the connection node between these two transistors is output as the switching voltage Vsw to the output inductor L1 which is an external component connected to the control circuit 100.

The output voltage Vout input to the voltage feedback terminal 106 as the feedback voltage is divided by the first resistor R1 and the second resistor R2. As a result, the detection voltage Vout'=R2/(R1+R2)×Vout is output, which is proportional to the output voltage Vout. The hysteresis comparator 10 compares the detection voltage Vout' that corresponds to the output voltage Vout of the step-down switching regulator 200 with the two threshold voltages, i.e., the low threshold voltage and the high threshold voltage. Of these two threshold voltages, the higher will be referred to as "first threshold voltage Vth1" hereafter. On the other hand, the lower will be referred to as "second threshold voltage Vth2" hereafter. The first threshold voltage Vth1 and the second threshold voltage Vth2 are generated by the threshold voltage generating circuit 20.

Figure 3:
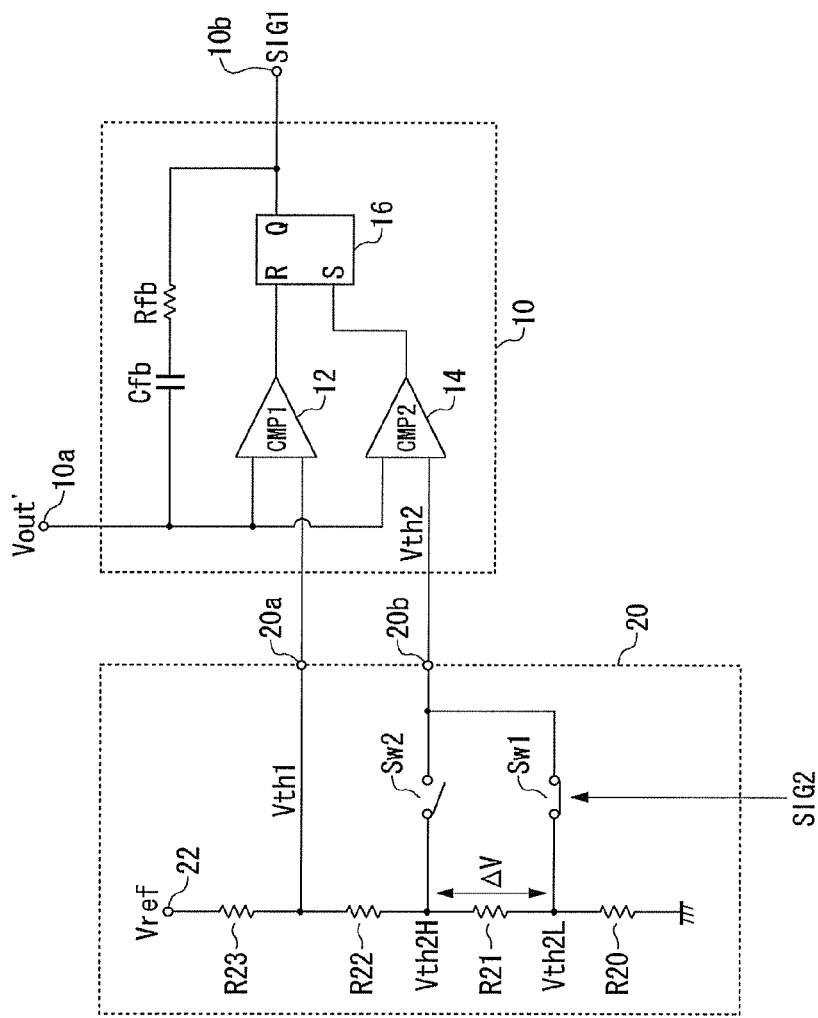
FIG. 3 is a circuit diagram which shows the configurations of a hysteresis comparator and a threshold voltage generating circuit.

FIG. 3 is a circuit diagram which shows the configurations of the hysteresis comparator 10 and the threshold voltage generating circuit 20.

The threshold voltage generating circuit 20 includes multiple voltage-dividing resistors R20 through R23, a first switch SW1, and a second switch SW2. The threshold voltage generating circuit 20 outputs the first threshold voltage Vth1 via a first output terminal 20a, and outputs the second threshold voltage Vth2 via a second output terminal 20b.

The voltage-dividing resistors R20 through R23 are connected in series between the reference voltage terminal 22, to which a predetermined reference voltage Vref is applied, and the ground. The voltage at the connection node between the dividing resistors R23 and R22 is output as the first threshold voltage Vth via the first output terminal 20a.

Furthermore, the connection node between the voltage-dividing resistors R20 and R21 is connected to the second output terminal 20b via the first switch SW1. Moreover, the connection node between the voltage-dividing resistors R21 and R22 is connected to the second output terminal 20b via the second switch SW2. With the present embodiment, when the control signal SIG2 is in the low-level state, the first switch SW1 is turned on. On the other hand, when the control signal SIG2 is in the high-level state, the second switch SW2 is turned on. Such an arrangement is capable of switching the second threshold voltage Vth2 output via the second output terminal 20b between two voltage values, i.e., the voltage value Vth2L and the voltage value Vth2H which shifts toward the higher-voltage side from the voltage value Vth2L by a predetermined voltage difference ΔV.

The hysteresis comparator 10 includes a first comparator 12, a second comparator 14, an RS flip-flop 16, a feedback capacitor Cfb, and a feedback resistor Rfb.

The first comparator 12 compares the detection voltage Vout' input to the input terminal 10a with the first threshold voltage Vth1. The second comparator 14 compares the detection voltage Vout' with the second threshold voltage Vth2. The set terminal of the RS flip-flop 16 is connected to the output terminal of the second comparator 14. Furthermore, the reset terminal thereof is connected to the output terminal of the first comparator 12. The hysteresis comparator 10 outputs the output signal of the RS flip-flop 16 as the pulse signal SIG1 via the output terminal 10b. Furthermore, the feedback capacitor Cfb and the feedback resistor Rfb are connected in series between the input terminal 10a of the hysteresis comparator 10 and the output terminal 10b thereof.

Returning to FIG. 1, the driver circuit 30 complementarily turns on/off the switching transistor M1 and the synchronous rectifier transistor M2 according to the pulse signal SIG1 output from the hysteresis comparator 10. When the pulse signal SIG1 is in the high-level state, the driver circuit 30 turns on the switching transistor M1. On the other hand, when the pulse signal SIG1 is in the low-level state, the driver circuit 30 turns on the synchronous rectifier transistor M2.

The light-load detection circuit 50 detects whether or not the load connected to the step-down switching regulator is in the light-load state. The light-load detection circuit 50 includes a light-load detection comparator 52. The light-load detection comparator 52 compares, with the ground voltage, the switching voltage Vsw at the connection node between the switching transistor M1 and the synchronous rectifier transistor M2. When the switching voltage Vsw is greater than 0 V, the light-load detection comparator 52 outputs the comparison signal Vcmp at the high level. On the other hand, when the switching voltage Vsw is smaller than 0 V, the light-load detection comparator 52 outputs the comparison signal Vcmp at the low level. The comparison signal Vcmp is output to the logic circuit 60 and the driver circuit 30.

In a case in which the switching voltage Vsw has exceeded the ground potential during a period when the synchronous rectifier transistor M2 is in the ON-state, i.e., during a period when the gate voltage Vg2 is in the high-level state, the comparison signal Vcmp is output at the high level. This forcibly sets the gate voltage Vg2 of the synchronous rectifier transistor M2 to the low-level state. As a result, the switching operations of the switching transistor M1 and the synchronous rectifier transistor M2 are stopped until the pulse signal SIG1 output from the hysteresis comparator 10 goes to the high-level state due to the drop of the detection voltage Vout' to the threshold voltage Vth2. That is to say, upon the light-load detection circuit 50 detecting the light-load state, the driver circuit 30 stops the ON/OFF operations of the switching device elements during a period until the detection voltage Vout' drops from the first threshold voltage Vth1 to the second threshold voltage Vth2.

The logic circuit 60 receives the pulse signal SIG1 output from the hysteresis comparator 10 and the comparison signal Vcmp output from the light-load detection circuit 50 as the input signals. The logic circuit 60 generates the control signal SIG2 based upon the two input signals thus received. Upon reception of the comparison signal Vcmp at the high level, the logic circuit 60 sets the control signal SIG2 to the high-level state after elapsing of a predetermined delay time τ. Furthermore, when the pulse signal SIG1 switches from the high-level state to the low-level state, the logic circuit 60 sets the control signal SIG2 to the low-level state.

Description will be made regarding the operation of the step-down switching regulator 200 having the above-described configuration with reference to the timing charts shown in FIGS. 4A and 4B, and FIGS. 5A through 5D. In these timing charts, the vertical axis and the horizontal axis have been expanded or reduced for simplification of explanation as appropriate.

Figure 4A:
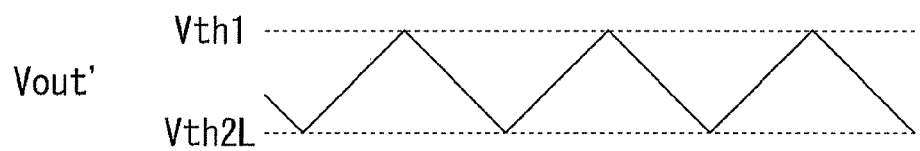
FIGS. 4A and 4B are time charts which show the operation state of the step-down switching regulator shown in FIG. 1 in a heavy-load state.
Figure 4B:
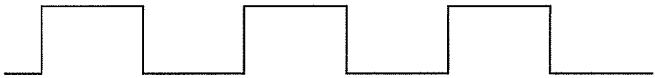
Figure 6A:
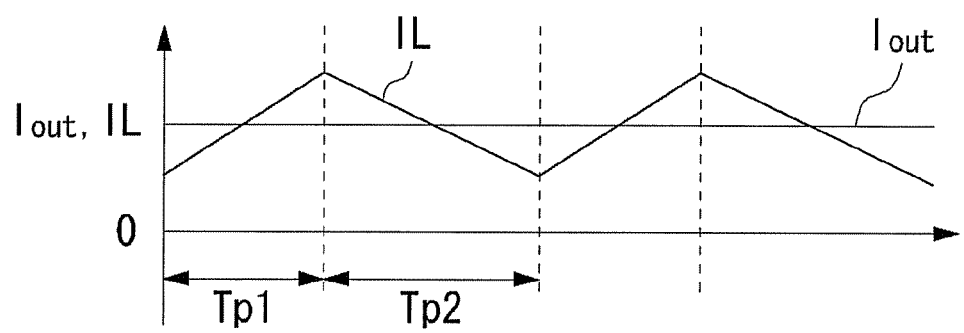
FIGS. 6A and 6B are diagrams which show the current waveforms of the synchronous rectifier step-down switching regulator with respect to time in the heavy-load state and in the light-load state, respectively.
Figure 6B:
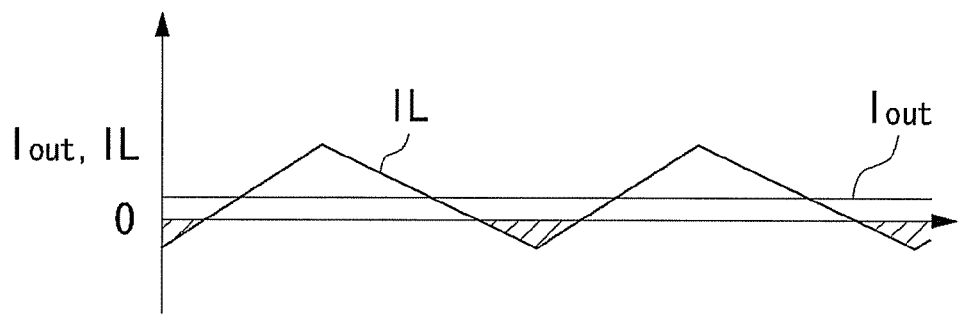

First, description will be made regarding the operation of the step-down switching regulator 200 in the heavy-load state with reference to FIGS. 4A and 4B. FIGS. 4A and 4B are time charts which show the operation state of the step-down switching regulator 200 shown in FIG. 1 in the heavy-load state. Specifically, FIG. 4A shows the detection voltage Vout'. FIG. 4B shows the pulse signal SIG1.

In the heavy-load state, the light-load detection circuit 50 does not detect the light-load state. Accordingly, the control signal SIG2 is maintained in the low-level state. Accordingly, the second threshold voltage Vth2 generated by the threshold voltage generating circuit 20 is set to VthL2. Furthermore, the driver circuit 30 complementarily turns on/off the switching transistor M1 and the synchronous rectifier transistor M2 according to the pulse signal SIG1 output from the hysteresis comparator 10.

In the heavy-load state, when the pulse signal SIG1 goes to the high-level state, the switching transistor M1 is turned on, thereby raising the output voltage Vout. When the detection voltage Vout' rises up to the first threshold voltage Vth1 as the output voltage Vout thus rises, the pulse signal SIG1 goes to the low-level state. When the pulse signal SIG1 goes to the low-level state, the driver circuit 30 turns off the switching transistor M1 and turns on the synchronous rectifier transistor M2. After the synchronous rectifier transistor M2 is turned on, the output voltage Vout drops. The detection voltage Vout' drops to the second threshold voltage Vth2 (=Vth2L) according to the drop in the output voltage Vout.

When the detection voltage Vout' drops to the second threshold voltage Vth2 (=Vth2L), the pulse signal SIG1 goes to the high-level state again, which turns on the switching transistor M1 and turns off the synchronous rectifier transistor M2. As described above, the detection voltage Vout' is maintained in a stable state between these two voltage values, i.e., the first threshold voltage Vth1 and the second threshold voltage Vth2 (=Vth2L).

Next, description will be made regarding the operation of the step-down switching regulator 200 in the light-load state with reference to FIGS. 5A through 5D. FIGS. 5A through 5D are time charts which show the operation state of the step-down switching regulator 200 shown in FIG. 1 in the light-load state. Specifically, FIG. 5A shows the detection voltage Vout', and the first and second threshold voltage Vth1 and Vth2. FIG. 5B shows the pulse signal SIG1. FIG. 5C shows the comparison signal Vcmp. FIG. 5D shows the control signal SIG2.

In the light-load state, at the time point T0, the pulse signal SIG1 transits from the low-level state to the high-level state. As described above, the hysteresis comparator 10 includes a feedback path formed of the feedback capacitor Cfb and the feedback resistor Rfb. Accordingly, the transition of the pulse signal SIG1 is input to the input terminal side as the feedback signal. As a result, the voltage at the inverting input terminal side of the hysteresis comparator 10 exceeds the threshold voltage of the hysteresis comparator 10 after elapsing of a predetermined period of time determined by the capacitance of the feedback capacitor Cfb and the resistance of the feedback resistor Rfb, whereupon the pulse signal SIG1 goes to the low-level state. When the pulse signal SIG1 transits from the high-level state to the low-level state, the transition of the pulse signal SIG1 is input as the feedback signal to the inverting input terminal via the feedback capacitor Cfb and the feedback resistor Rfb, whereupon the pulse signal SIG1 goes to the high-level state again. As described above, in the light-load state, the hysteresis comparator 10 outputs the pulse signal SIG1 alternately switching between the high-level state and the low-level state by means of the feedback capacitor Cfb and the feedback resistor Rfb.

The driver circuit 30 complementarily turns on/off the switching transistor M1 and the synchronous rectifier transistor M2 according to the pulse signal SIG1. As a result, the output voltage Vout gradually rises, and accordingly, the detection voltage Vout' gradually rises. At the time point T1, the detection voltage Vout' reaches the first threshold voltage Vth1. Let us say that each comparator has a delay time $\Delta T1$. The pulse signal SIG1 goes to the low-level state at the time point T2 after the delay time $\Delta T1$ from the time point T1. After the detection voltage Vout' exceeds the first threshold voltage Vth1, the feedback voltage, which is input via the feedback capacitor Cfb and the feedback resistor Rfb and which corresponds to the transition of the pulse signal SIG1, does not exceed the threshold voltage. As a result, the switching mechanism including the feedback capacitor Cfb and the feedback resistor Rfb does not involve the switching of the pulse signal SIG1. Accordingly, the pulse signal SIG1 is maintained in the low-level state during a period until the detection voltage Vout' drops to the second threshold voltage Vth2.

When the pulse signal SIG1 goes to the low-level state at the time point T2, the driver circuit 30 turns on the synchronous rectifier transistor M2, and turns off the switching transistor M1. After the synchronous rectifier transistor is turned on, the inductor current IL flowing in the positive direction gradually drops. Subsequently, the direction of the inductor current IL switches from the positive direction to the negative direction at the time point T3. In this stage, the comparison signal Vcmp, which is the output signal of the light-load detection circuit 50, goes to the high-level state. When the comparison signal Vcmp goes to the high-level state, the driver circuit 30 forcibly turns off the synchronous rectifier transistor M2, thereby stopping the switching operation thereof. After stopping of the switching operations of the switching transistor M1 and the synchronous rectifier transistor M2, no charge is supplied to the output capacitor C1. Accordingly, the detection voltage Vout' gradually drops.

The logic circuit 60 sets the control signal SIG2 to the high-level state at the time point T4 after the predetermined delay time $\tau$ from the time point T3 at which the comparison signal Vcmp goes to the high-level state, i.e., at which the light-load state is detected. When the control signal SIG2 goes to the high-level state, the threshold voltage generating circuit 20 shifts the second threshold voltage Vth2 by a predetermined voltage difference $\Delta V$ from the threshold voltage Vth2L initially set to the higher threshold voltage Vth2H. The detection voltage Vout' continues to gradually drop. Subsequently, at the time point T5, the detection voltage Vout' drops to the second threshold voltage Vth2 (=Vth2H) thus shifted higher. The pulse signal SIG1 goes to the high-level state at the time point T6 after elapsing of the delay time $\Delta T1$ of the hysteresis comparator 10 from the time point T5 at which the detection voltage Vout' becomes smaller than the second threshold voltage Vth2H.

With such an arrangement, restarting of the switching operation of the driver circuit 30 after the switching operation thereof is stopped requires a certain period of time ΔT2. Accordingly, the switching operation is restarted at the time point T7 after elapsing of the period of time ΔT2 from the time point T6 at which the pulse signal SIG1 goes to the high-level state. That is to say, the restarting of the switching operation after the detection voltage Vout' drops to the second threshold voltage Vth2H requires a delay time ΔT=ΔT1+ΔT2. During this delay time ΔT, the detection voltage Vout' drops by the voltage width δV.

Let us consider an arrangement in which the second threshold voltage Vth2 is fixed to the constant value Vth2L, i.e., the voltage difference ΔV is set to zero. With such an arrangement, in the light-load state, the detection voltage Vout' drops to (Vth2L−δV), leading increased rippling of the output voltage Vout.

In order to solve the aforementioned problem, with the step-down switching regulator 200 according to the present embodiment, the voltage difference ΔV is set in the threshold voltage generating circuit 20 such that the voltage difference ΔV is approximately equal to δV. Such an arrangement in which the voltage difference ΔV is set to such a value suitably prevents the detection voltage Vout' from becoming smaller than the second threshold voltage Vth2L, thereby reducing rippling of the output voltage Vout.

When the pulse signal SIG1 goes to the low-level state at the time point T6, the logic circuit 60 sets the control signal SIG2 to the low-level state. When the control signal SIG2 goes to the low-level state, the threshold voltage generating circuit 20 shifts the second threshold voltage Vth2 again to the lower threshold voltage which is lower than the higher threshold voltage by the predetermined voltage difference ΔV.

At the time point T7, the driver circuit 30 turns on the switching transistor M1. After the switching transistor M1 is turned on, the detection voltage Vout' rises. Subsequently, the hysteresis comparator 10 repeatedly switches the pulse signal SIG1 between the high-level state and the low-level state according to the period in time determined by the feedback capacitor Cfb and the feedback resistor Rfb, thereby raising the detection voltage Vout'.

As described above, with the step-down switching regulator 200 according to the present embodiment, in a case in which the load becomes small, the second threshold voltage Vth2 employed in the hysteresis comparator 10 is raised by the predetermined voltage difference ΔV. Such an arrangement reduces rippling of the output voltage Vout (detection voltage Vout').

Furthermore, with such an arrangement, the second threshold voltage Vth2 is shifted after elapsing of the delay time τ from the time point at which the light-load state is detected. Such an arrangement enables the switching operation to be immediately restarted in a case in which the load state returns to the heavy-load state immediately after the load state enters the light-load state.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Description has been made in the present embodiment regarding an arrangement including the hysteresis comparator 10 having the configuration shown in FIG. 3. However, the present invention is not restricted to such an arrangement. An arrangement may be made including a hysteresis comparator having a configuration employing the positive-feedback method such as an ordinary hysteresis comparator.

Description has been made in the embodiment regarding an arrangement in which the load to be driven by the step-down switching regulator 200 including the control circuit 100 is a microprocessor. However, the present invention is not restricted to such an arrangement. Also, the step-down switching regulator 200 can supply the driving voltage to various loads which operate in the light-load state in which the load current is reduced.

Description has been made in the embodiment regarding an arrangement in which the control circuit 100 is monolithically integrated in the form of a single LSI. However, the present invention is not restricted to such an arrangement. Also, a part of the components may be provided in the form of discrete components or chip components which are external to the LSI. Also, these components may be provided in the form of multiple LSIs.

The settings of the logical values of the signals in the circuit, such as the high-level state and the low-level state of the signals, have been described in the embodiments for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A control circuit which turns on/off switching device elements of a synchronous rectifier switching regulator, comprising:
   a hysteresis comparator which compares a detection voltage that corresponds to an output voltage of said step-down switching regulator with a first threshold voltage and a second threshold voltage which is lower than the first threshold voltage;
   a light-load detection circuit which detects whether or not a load connected to said step-down switching regulator is in the light-load state; and
   a driver circuit which turns on/off said switching device elements according to a pulse signal output from said hysteresis comparator,
   wherein, upon said light-load detection circuit detecting the light-load state, said hysteresis comparator shifts the second threshold voltage toward a higher voltage side by a predetermined voltage difference,
   and wherein, after said light-load detection circuit detects the light-load state, said driver circuit stops the ON/OFF operation of said switching device elements during a period from the time point at which the detection voltage rises up to the first threshold voltage to the time point at which the detection voltage drops to the second threshold voltage thus shifted.

2. A control circuit according to claim 1, wherein said hysteresis comparator shifts the second threshold voltage to the higher voltage side after elapsing of a predetermined delay time from the time point at which the light-load state is detected.

3. A control circuit according to claim 1, wherein, when the detection voltage drops to the second threshold voltage thus shifted after the second threshold voltage is shifted to the higher voltage side, said hysteresis comparator shifts the second threshold voltage toward a lower voltage side by the aforementioned predetermined voltage difference again.

4. A control circuit according to claim 1, wherein said hysteresis comparator includes a feedback resistor and a feedback capacitor connected in series between an output terminal thereof and a terminal to which the detection voltage is input.

5. A control circuit according to claim 1, wherein said hysteresis comparator includes:
   a first comparator which compares the detection voltage with the first threshold voltage;
   a second comparator which compares the detection voltage with the second threshold voltage; and
   a flip-flop circuit which is set and reset according to the output signals of said first comparator and said second comparator,
   wherein the output signal of said flip-flop circuit is output as the aforementioned pulse signal.

6. A control circuit according to claim 5, further comprising a threshold voltage generating circuit which generates the first and second threshold voltages,
   wherein said threshold voltage generating circuit includes a plurality of voltage-dividing resistors connected in series between a reference voltage terminal, to which a predetermined reference voltage is applied, and the ground,
   and wherein voltages are selected from among a plurality of voltages at nodes at which said resistors are connected to one another, and the voltages thus selected are output as the first threshold voltage and the second threshold voltage.

7. A control circuit according to claim 1, wherein said light-load detection circuit includes a light-load detection comparator which compares, with the ground potential, a switching voltage at the connection node between a switching transistor and a synchronous rectifier transistor, each of which is the switching device element,
   and wherein, in a case in which the switching voltage exceeds the ground potential during the ON-state of said synchronous rectifier transistor, said light-load detection circuit determines that the load is in the light-load state.

8. A control circuit according to claim 1, wherein said control circuit is monolithically integrated on a single semiconductor substrate.

9. A step-down switching regulator comprising:
   a switching regulator output circuit which includes an output capacitor with one grounded terminal, and an output inductor with one terminal connected to the other terminal of said output capacitor; and
   a control circuit according to claim 1, which supplies a switching voltage to said switching regulator output circuit,
   wherein the output at the other terminal of said output capacitor is output as the output voltage.

10. An electronic device comprising:
    a battery;
    a microprocessor; and
    a step-down switching regulator according to claim 9, which steps down the battery voltage output from said battery, and which supplies the battery voltage thus stepped down to said microprocessor.

* * * * *